March 2, 1971  W. E. HAMPTON  3,566,701
WHEEL SPINNING DEVICES
Filed Nov. 15, 1968
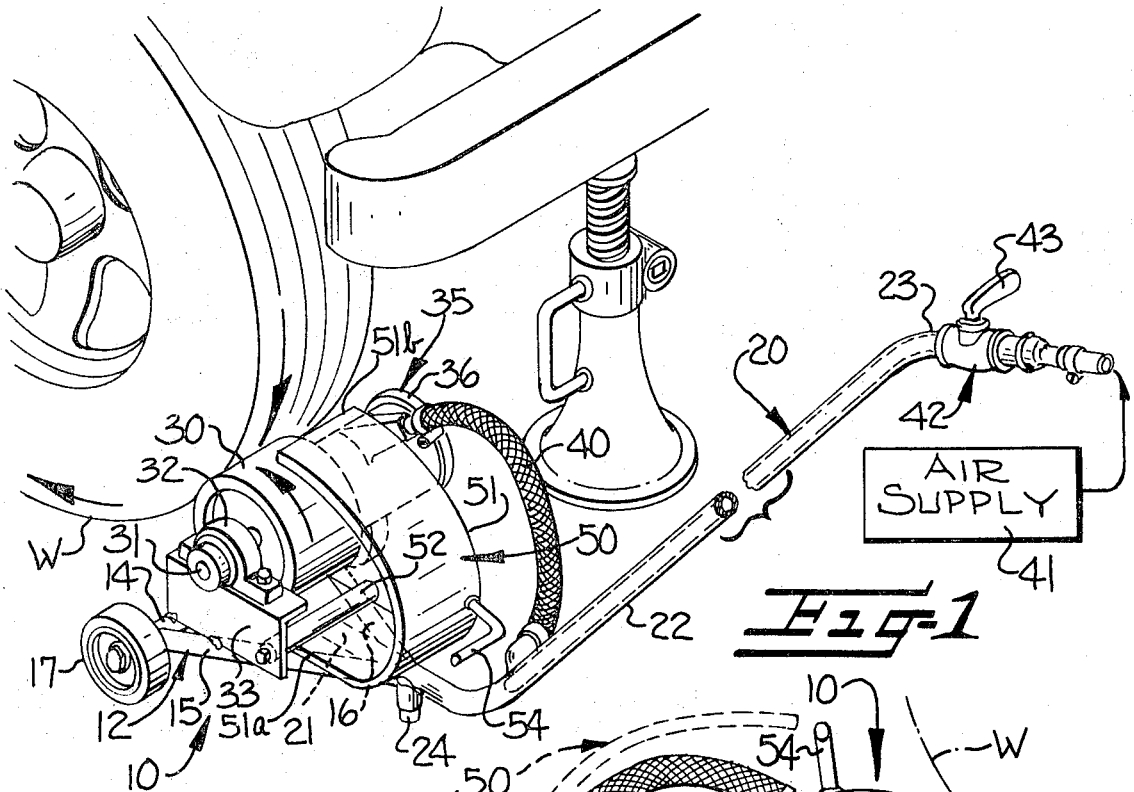
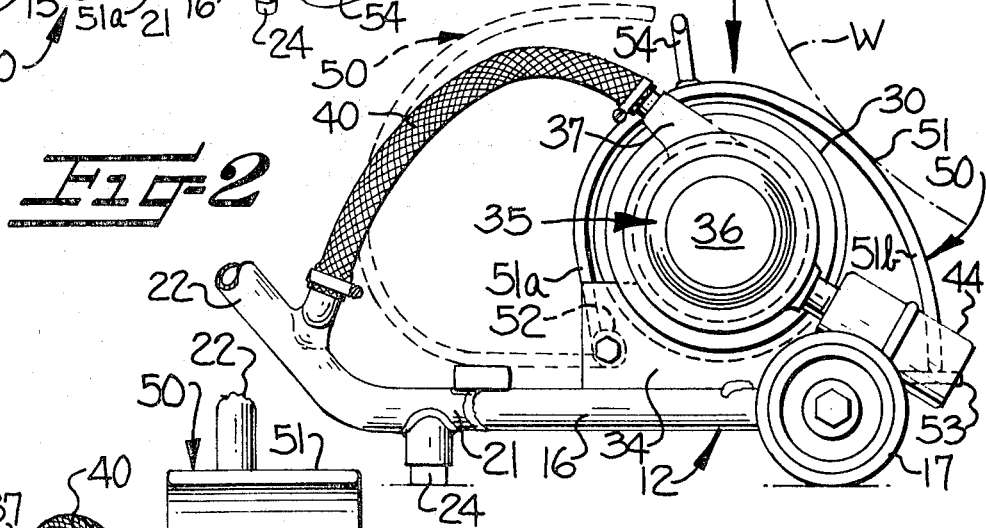
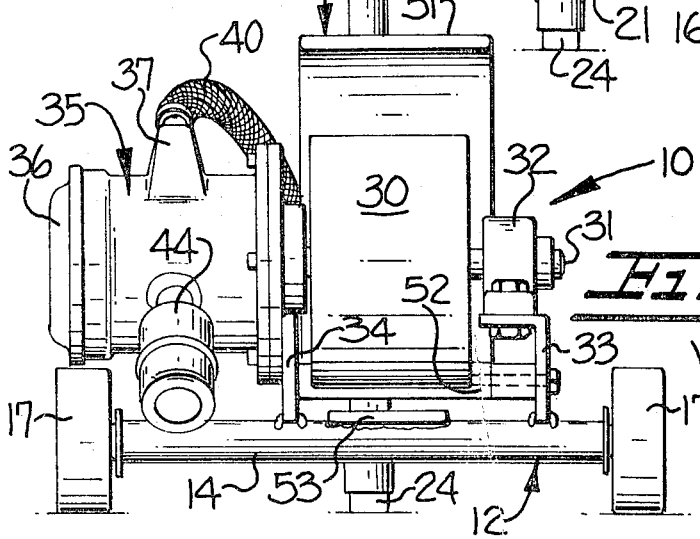
INVENTOR:
WILLIAM E. HAMPTON
BY Parrott, Bell, Seltzer,
Park & Gibson
ATTORNEYS United States Patent Office 3,566,701
Patented Mar. 2, 1971

3,566,701
WHEEL SPINNING DEVICES
William E. Hampton, Charlotte, N.C., assignor to Commercial Equipment Company, Inc., Charlotte, N.C.
Filed Nov. 15, 1968, Ser. No. 776,048
Int. Cl. F16m *3/00*
U.S. Cl. 74—16                                2 Claims

ABSTRACT OF THE DISCLOSURE

A wheel spinning device for rotating a relatively large and heavy vehicle wheel mounted in position on the vehicle including a rotatable member adapted to frictionally engage the peripheral surface of the vehicle wheel, and drive means for rotating the rotatable member and being capable of delivering torque when operating near a stalled condition at least substantially as great as that delivered when operating at normal speed to overcome the inertia of a heavy vehicle wheel in a rest condition and to bring the wheel up to a road speed condition without excessive strain on the drive means.

---

The present invention relates to wheel spinning devices and more particularly to such wheel spinning devices adapted for use with relatively large and heavy vehicle wheels mounted in position on a vehicle.

For optimum balancing of vehicle wheels, it is desirable that such wheels be balanced under normal operating conditions, as when the wheel is mounted in position on the vehicle and is rotating at normal road speed. Devices are presently available for rotating vehicle wheels mounted in position on the vehicle, but severe problems encountered in the use of such conventional wheel spinning devices have limited their usefulness to automobile wheels and other similar lightweight and relatively small wheels. In this connection, such conventional wheel spinning devices have universally included an electrical motor of the induction type for driving the wheels in rotation.

With automobile and other relatively small and lightweight vehicle wheels, such conventional wheel spinners have been adequate even though the induction motors thereof have the characteristic of delivering very low torque when operating near a stalled condition as compared to the torque delivered thereby when operating at normal speed. This low-torque problem may be overcome by the operator manually imparting initial rotation to the wheel before the wheel spinner is brought into contact therewith to thereby avoid a near stalled condition of the wheel spinner.

With larger and heavier vehicle wheels, as for example those used on tractor-trailer vehicles and the like, it is frequently impossible or impractical for the operator to manually impart initial rotation to the vehicle wheel before bringing the wheel spinning device into contact therewith and frequent failures of the induction-type electrical motors of conventional wheel spinning devices have resulted. The frequent replacement of these motors has been of considerable concern to users of this type device due to the expense and "down time" encountered therewith.

It is therefore an object of the present invention to provide a wheel spinning device which obviates the aforementioned problems heretofore encountered with conventional wheel spinning devices by delivering to the vehicle wheel in or near a rest condition torque at least substantially as great as the torque delivered thereto when the wheel is rotating at normal speed.

A more specific object of the present invention is to provide a wheel spinning device of the character described which includes drive means capable of delivering torque when operating near a stalled condition at least substantially as great as that delivered when the drive means is operating at normal speed.

Some of the objects of the invention having been stated, other objects will appear as the description proceeds, when taken in connection with the accompanying drawings, in which—

FIG. 1 is an isometric view of a wheel spinning device in accordance with the present invention with portions broken away and illustrating the use of the device in connection with a vehicle wheel;

FIG. 2 is an enlarged, fragmentary, side elevational view looking from the right hand side of the wheel spinning device shown in FIG. 1; and FIG. 3 is a fragmentary, front elevational view looking from the right in FIG. 2.

Referring now more specifically to the drawings, there is shown a wheel spinning device 10 incorporating the features of the present invention. Wheel spinning device device 10 includes a frame which may be of any suitable character but preferably includes a base 12. Base 12 includes a generally triangular portion having a member 14 extending along the base of the triangle and respective converging side members 15, 16. Side members 15, 16 are connected to member 14 at one of their ends at points spaced inwardly of the ends of member 14 so that member 14 extends outwardly therefrom. Suitable wheels 17 are rotatably mounted on these projecting portions of member 14 to make the device 10 portable.

A handle member 20 has a first horizontal portion 21 bisecting triangular portion 13 and secured at one end to member 14 and also connected to members 15 and 16. Handle member 20 includes an inclined portion 22 and a second horizontal portion 23. A rest member 24 is mounted on the first horizontal portion 21 of handle member 20 to cooperate with the wheels 17 for holding the wheel spinning device 10 in proper position adjacent a wheel W.

A rotatable member 30 is mounted on a shaft 31 for rotation therewith and includes a peripheral surface adapted to engage the peripheral surface of the vehicle wheel W for driving the vehicle wheel in rotation. The peripheral surface of rotatable member 30 preferably has a coefficient of friction relative to the surface of the vehicle wheel to provide a controlled amount of slippage between the rotatable member 30 and vehicle wheel W when the vehicle wheel is being initially started in rotation to relieve some of the load encountered during this period of operation.

Shaft 31 is supported for rotation at one end by a bearing 32 mounted on an angle bracket member 33 which in turn is mounted on the triangular portion 13 of base 12. A second bracket member 34 is mounted on the triangular portion 13 on the opposite side of rotatable member 30 from the bracket 33.

Drive means 35 capable of delivering torque when operating near a stalled condition at least substantially as great as that delivered when operating at normal speed is provided and preferably comprises an air motor 36 which is mounted on bracket 34 and whose output shaft is shaft 31 on which the rotatable member 30 is mounted. Air motor 36 has an inlet means 37 which is connected by a conduit 40 to handle member 20 which is tubular and in turn is connected to a suitable source of compressed air 41. Preferably, handle member 20 has connected therein a valve means 42 which is controlled by a suitable handle 43 operatively associated therewith. Also, air motor 35 preferably has a suitable muffler device 44 connected on the air outlet 45 thereof.

Air motor 36 may be of an suitable type providing the aforementioned characteristics. One example of such a motor is the vane-type air motor manufactured and sold by the Ingersoll-Rand Company, New York, N.Y.

Wheel spinning device 10 also includes a suitable braking means 50 for retarding rotation of the wheel W from a road speed condition to a rest condition. Braking means 50 comprises a cover member 51 of generally inverted U-shaped configuration which has one leg 51a thereof mounted by a member 52 extending between brackets 33 and 34 for pivotal movement between an inoperative position in which the rotatable member 30 is exposed and an operative position wherein the rotatable member 30 is disposed between the legs of the U-shaped member 51 and is covered thereby. A stop member 53 is mounted on base member 14 and extends forwardly thereof and is engaged by the other leg 51b of member 51 to properly position and maintain the member 51 in the operative position in covering relation to but out of contact with rotatable member 30. A handle 54 is mounted on member 51 to facilitate movement thereof between the operative and inoperative positions.

In operation, when it is desired to bring a vehicle wheel from a rest condition to a road speed condition to facilitate proper balancing of the wheel, cover member 51 is moved to the inoperative position (shown in FIG. 1) and device 10 is moved into position with the peripheral surface of rotatable member 30 in contact with the peripheral surface of the wheel W. Controlled amounts of compressed air are then delivered from the air supply 41 to the air motor 36 through handle member 20 and conduit 40 under control of the valve means 42 by manipulation of the valve handle 43.

Air motor 36 has the characteristics of delivering torque when it is operating near a stalled condition substantially at least as great as the torque delivered thereby when operating at normal speed. Upon admission of the compressed air to motor 36, the same drives rotatable member 30 in rotation which delivers torque to the vehicle wheel W sufficient to overcome the inertia thereof and to bring the wheel from its rest condition up to a road speed condition without excessive strain on the motor 36.

After the wheel reaches a road speed condition and the balance thereof has been observed, the device 10 may be moved away from the wheel and cover or brake member 51 moved from the inoperative position to the operative position (shown in FIG. 2). The device 10 is then moved back into position adjacent the vehicle wheel W with the member 51 in contact with the peripheral surface thereof. This applies a retarding action to the wheel to bring it back to a rest condition.

It will therefore be apparent that a novel wheel spinning device is provided which is capable of rotating large and heavy wheels from a rest condition up to a road speed condition without excessive strain on the wheel spinning device.

In the drawings and specification there has been set forth a preferred embodiment of the invention, and although specific terms are employed, they are used in a generic and descriptive sense only and not for purposes of limitation, the scope of the invention being defined in the claims:

That which is claimed is:
1. A wheel spinning device for rotating a relatively large and heavy vehicle wheel mounted in position on the vehicle from a rest condition to a road speed condition to facilitate proper balancing of the wheel under normal operating condition, said spinning device comprising
   a rotatable member having a peripheral surface adapted to frictionally engage the peripheral surface of a vehicle wheel for driving the vehicle wheel in rotation,
   an air motor capable of delivering torque when operating near a stalled condition at least substantially as great as that delivered when operating at normal speed and having an output shaft connected to said rotatable member for rotating the same and for delivering thereto torque sufficient to overcome the inertia of a heavy vehicle wheel in a rest condition and to bring the wheel up to a road speed condition without excessive strain on said air motor,
   a source of compressed air,
   means connected between said air motor and said source of compressed air for delivering controlled amounts of compressed air to said air motor, said air delivering means including a tubular handle operatively connected to said device, said handle including a remote end and having valve means carried at said remote end for controlling the amount of air delivered to said air motor, and
   brake means for applying a braking force to a rotating vehicle wheel to bring the same to a rest condition.
2. A wheel spinning device according to claim 1 wherein said brake means comprises a generally inverted U-shaped brake member pivotally mounted for movement between an operative position wherein the same covers said rotatable member and is adapted to contact the peripheral surface of the vehicle wheel to impart a braking force thereto and an inoperative position wherein the same does not cover said rotatable member and the rotatable member is therefore exposed to contact the vehicle wheel.

References Cited
UNITED STATES PATENTS

| | | | |
|---|---|---|---|
| 2,018,160 | 10/1935 | Weaver | 74—16 |
| 2,565,233 | 8/1951 | Hunter, Jr. | 74—16 |
| 2,750,809 | 6/1956 | Thomas | 74—16X |
| 2,823,547 | 2/1958 | Hosking | 74—16 |
| 3,030,815 | 4/1962 | Lill et al. | 74—16 |
| 3,071,221 | 1/1963 | Hosking | 74—16X |
| 3,105,387 | 10/1963 | Shoemaker et al. | 74—16 |

FRED C. MATTERN, JR., Primary Examiner

F. D. SHOEMAKER, Assistant Examiner